(12) United States Patent
Shiomi (10) Patent No.: US 9,344,593 B2
(45) Date of Patent: May 17, 2016

(54) IMAGE READING APPARATUS (71) Applicant: BROTHER KOGYO KABUSHIKI KAISHA, Nagoya-shi, Aichi-ken (JP)

(72) Inventor: Hiroshi Shiomi, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/668,652

(22) Filed: Mar. 25, 2015

(65) Prior Publication Data

US 2015/0281483 A1 Oct. 1, 2015

(30) Foreign Application Priority Data

Mar. 31, 2014 (JP) ................................. 2014-071998

(51) Int. Cl.
*H04N 1/04* (2006.01)
*H04N 1/00* (2006.01)

(52) U.S. Cl.
CPC ....... *H04N 1/00533* (2013.01); *H04N 1/00559* (2013.01)

(58) Field of Classification Search
CPC ................. H04N 1/00533; H04N 1/00559
USPC .................... 358/474, 498, 497, 496
See application file for complete search history.

(56) References Cited

U.S. PATENT DOCUMENTS

| 7,224,495 B2 * | 5/2007 | Yui ..................... H01N 1/00976 358/474 |
| 2012/0026558 A1 | 2/2012 | Fujiwara |
| 2012/0034106 A1 | 2/2012 | Lecoffre et al. |
| 2014/0153068 A1 | 6/2014 | Xu et al. |

FOREIGN PATENT DOCUMENTS

| JP | 2012034106 A | 2/2012 | |
| JP | 2014110439 A | 6/2014 | |
| KR | 2001-0095193 | * 11/2001 | ............... H04N 1/04 |

* cited by examiner

*Primary Examiner* — Houshang Safaipour
(74) *Attorney, Agent, or Firm* — Merchant & Gould P.C.

(57) ABSTRACT

An image reading apparatus includes a base, a supporter supporting a reading object, a reader provided on a mover and disposed between the base and the supporter. The image reading apparatus further includes a flexible flat cable. A first holder provided on the mover and holds a portion of the flat cable in a state in which the first holder is held in contact with a surface of the flat cable. A second holder holds the portion of the flat cable together with the first holder in a state in which the second holder is held in contact with a surface of the flat cable. The flat cable is interposed between the first holder and the second holder and held by the first holder and the second holder.

12 Claims, 10 Drawing Sheets

IMAGE READING APPARATUS

CROSS REFERENCE TO RELATED APPLICATION

The present application claims priority from Japanese Patent Application No. 2014-071998, which was filed on Mar. 31, 2014, the disclosure of which is herein incorporated by reference to its entirety.

BACKGROUND

1. Technical Field

The following disclosure relates to an image recording apparatus.

2. Related Art

A conventional image recording apparatus comprises a base, a supporter, a reader, a carriage and a flat cable.

The base has a generally box-like shape having a bottom surface. The supporter is disposed above the base, having a space above the bottom surface of the base. In the supporter, one of opposite surfaces, which is opposite to the other surface facing the bottom surface of the base, is a document supporting surface on which a document is supported. The reader is disposed between the bottom surface of the base and the supporter. The reader extends in a main scanning direction and is held by the carriage. The carriage is capable of reciprocating in a sub scanning direction perpendicular to the main scanning direction in a space between the bottom surface of the base and the supporter. One end portion (a first end portion) of the flat cable is attached to the base, while the other end portion (a second end portion) of the flat cable is connected to the reader. The flat cable is flexible.

Described in more detail, the flat cable has a first extending portion, a curved portion and a second extending portion. The first extending portion extends from the first end portion and extends in a direction toward one end (a first end) of the base in the sub scanning direction. The curved portion extends from the first extending portion and is curved in such a manner as extending toward the supporter and then extending in a direction toward the other end (a second end) of the base in the sub scanning direction. The second extending portion extends from the curved portion and extends in a direction toward the second end of the base in the sub scanning direction and extends to the second end portion of the flat cable.

Further, the image reading apparatus comprises a holder. The holder is provided on the carriage. The holder holds an end portion of the second extending portion of the flat cable which is closer to the second end of the base than to a first end portion of the second extending portion. The holder is held in contact with a third surface of the flat cable facing the base.

In the above-described image reading apparatus, when the carriage reciprocates in the sub scanning direction, the reader moves with the carriage and reads the image on the document that is supported on the document supporting surface. In this situation, the curved portion of the flat cable reciprocates with reciprocating movement of the carriage. When the curved portion of the flat cable moves, one of the first extending portion and the second extending portion becomes short, while the other of the first extending portion and the second extending portion becomes long. Accordingly, in the image reading apparatus, the flat cable follows the reciprocating movement of the carriage without interrupting image reading by the reader.

SUMMARY

In the conventional image reading apparatus, in order to prevent the end portion of the second extending portion of the flat cable from moving away from the holder, for example, there is a case in which the portion of the second extending portion of the flat cable is attached to the holder by adhesive means such as a double-sided adhesive tape. In this case, however, when the second extending portion of the flat cable is pushed or pulled with the reciprocating movement of the carriage, or when the second extending portion of the flat cable is pushed toward the supporter by restoring force of the curved portion of the flat cable, load works on the adhesive means, and there is a problem that the portion of the second extending portion of the flat cable comes off from the holder. When the portion of the second extending portion comes off from the holder, the second extending portion is easily shifted from a predetermined position, and such problems may occur that the flat cable comes into contact with the supporter and that the flat cable interrupts the reciprocating movement of the carriage. In the conventional image reading apparatus, image-reading quality by the reader may be deteriorated.

Aspects of the disclosure relate to an image reading apparatus capable of restraining the deterioration in the image-reading quality by the reader caused by the flat cable.

According to aspects of the present disclosure, there is provided an image reading apparatus comprising: a base; a supporter spaced apart from the base and having a first surface and a second surface opposite to the first surface, the first surface supporting a reading object, the second surface facing the base; a reader disposed between the base and the supporter and extending in a main scanning direction, the reader being configured to read image of the reading object supported on the first surface of the supporter; a mover configured to reciprocate, in a space between the base and the supporter, in a sub scanning direction while holding the reader, the sub scanning direction being perpendicular to the main scanning direction; a flexible flat cable; a first holder provided on the mover and configured to hold a portion of the flat cable in a state in which the first holder is held in contact with a third surface of the flat cable, the third surface facing the base; and a second holder configured to hold the portion of the flat cable together with the first holder in a state in which the second holder is held in contact with a fourth surface of the flat cable, the fourth surface being opposite to the third surface of the flat cable.

BRIEF DESCRIPTION OF THE DRAWINGS

The above and other objects, features, advantages and technical and industrial significance of the present disclosure will be better understood by reading the following detailed description of preferred embodiments, when considered in connection with the accompanying drawings, in which.

DETAILED DESCRIPTION OF THE PREFERRED EMBODIMENTS

Hereinafter, there will be described an embodiment with reference to the drawings.

<Embodiment>

Figure 1:
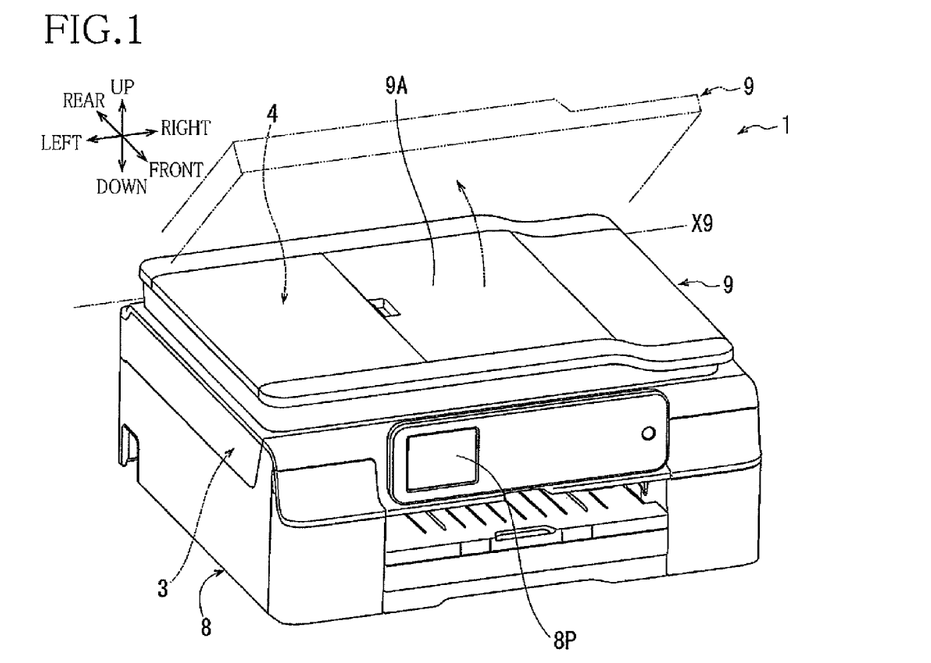
FIG. 1 is a perspective view showing an image reading apparatus as an embodiment is applied.

As illustrated in FIG. 1, an image reading apparatus 1 in the embodiment is an example of specific embodiments of an image reading apparatus. In FIG. 1, a portion of the image reading apparatus 1 in which an operation panel 8P is provided is defined as a front portion of the apparatus 1. When a user face the front panel 8P, a portion on the user's left hand (a left side of the user) is defined as a left portion (a left side) of the apparatus 1. A front-rear direction, a left-right direction and an up-down direction are illustrated based on the above-mentioned definition. The front-rear, left-right, and up-down directions illustrated in each of FIGS. 2 through 11 will be illustrated in accordance with the front-rear, left-right, and up-down directions illustrated in FIG. 1. Hereinafter, each of composing elements of the image reading apparatus 1 will be described with reference to FIG. 1 and so on.

<Configuration>

Figure 2:
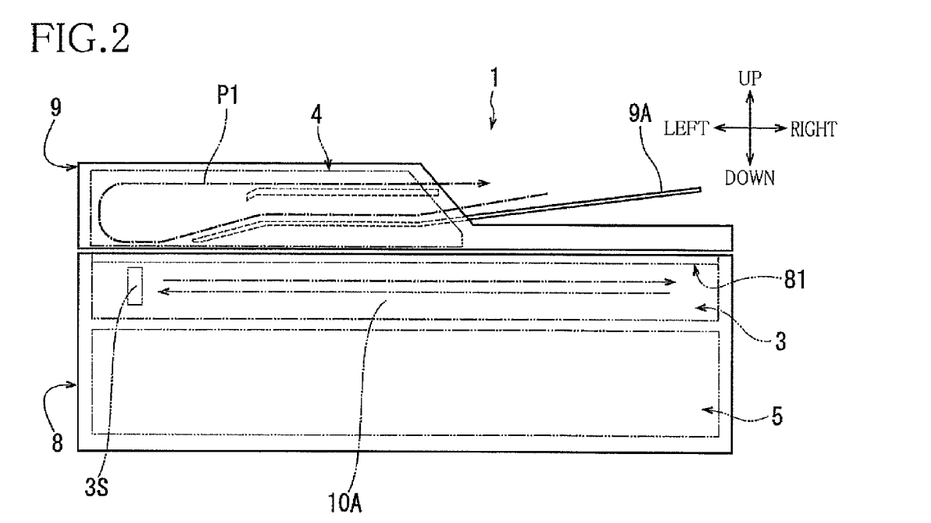
FIG. 2 is a schematic front view of the image reading apparatus.

As illustrated in FIGS. 1 and 2, the image reading apparatus 1 comprises a housing 8, an opening/closing unit 9, an image forming unit 5, a reading unit 3 (as an example of a reader) and a conveyor 4. The housing 8 has a generally flat box-like shape. As illustrated in FIG. 1, the operation panel 8P such as a touch panel and so forth is disposed on a front surface of the housing 8.

As illustrated in FIG. 2, the reading unit 3 is located in an upper portion of the housing 8. The image forming unit 5 is accommodated in a lower portion of the housing 8. The image forming unit 5 forms an image on a sheet by inkjet printing, laser printing, or the like.

Figure 3:
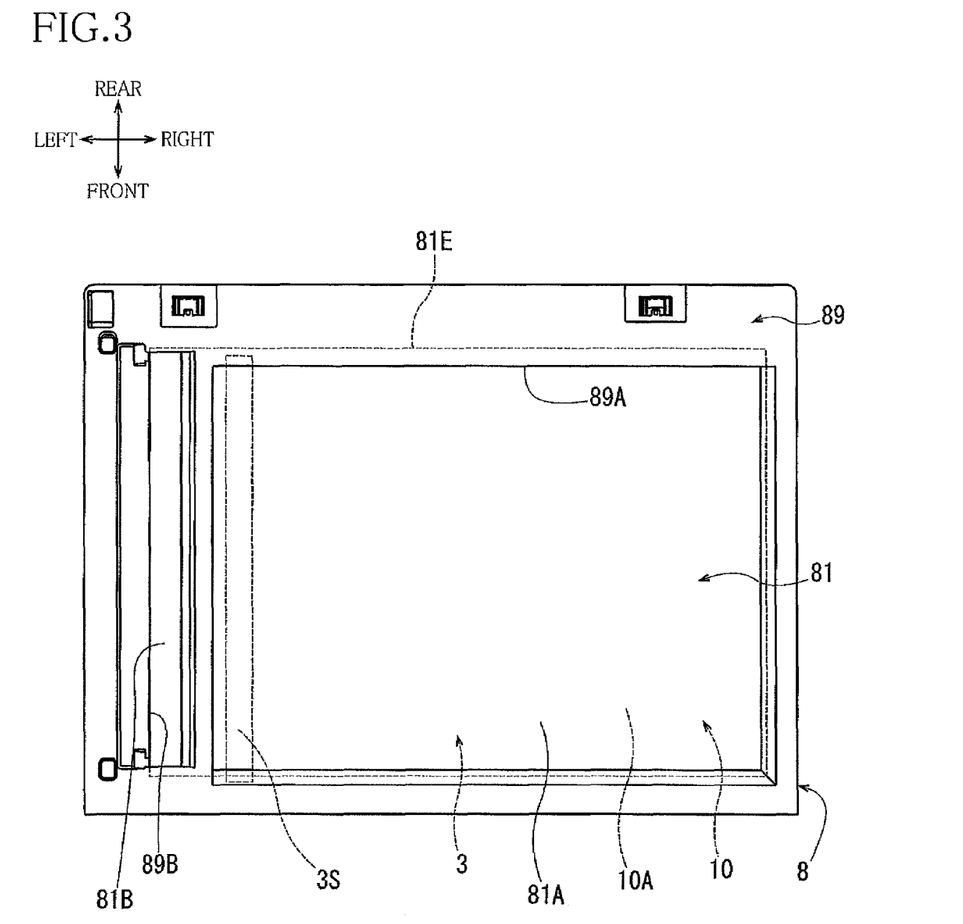
FIG. 3 is a plan view showing a platen glass and a frame in the image reading apparatus.

As illustrated in FIGS. 3 through 7, the reading unit 3 comprises a base 10, a platen glass 81 (as an example of a supporter) and a frame 89. As illustrated in FIG. 3, the platen glass 81 is disposed on an upper surface of the reading unit 3. The frame 89 covers an outer circumference 81E of the platen glass 81. A first opening 89A and a second opening 89B are formed in the frame 89. The first opening 89A is a large rectangular opening. The second opening 89B is located on a left portion of the first opening 89A in the frame 89 and is an elongated rectangular opening in the front-rear direction. The base 10 and the frame 89 nip and hold the platen glass 81 in the up-down direction.

A document supporting surface 81A (as an example of a first surface) and a reading surface 81B are formed on an upper surface of the platen glass 81. The document supporting surface 81A is a portion of the upper surface of the platen glass 81 which is exposed outside through the first opening 89A. When the reading unit 3 reads an image on a document in a state in which the document stands still, a lower surface of the document is supported on the document supporting surface 81A. The document for reading (as an example of a reading object, hereinafter referred to as "reading object") includes sheets such as sheets of paper, OHP sheets, books, and so forth. The reading surface 81B is a portion of the upper surface of the platen glass 81 which is exposed outside through the second opening 89B. When the reading unit 3 reads the image on each of the sheets which are conveyed one by one by the conveyor 4, a lower surface of the sheet being conveyed is guided on the reading surface 81B.

As illustrated in FIG. 1, the opening/closing unit 9 is pivotably supported about an opening/closing axis X9 extending in the left-right direction by a hinge (not illustrated) which is disposed in an upper edge of a rear surface of the housing 8. In a state in which the opening/closing unit 9 is closed as indicated by a solid line in FIG. 1, the opening/closing unit 9 covers the document supporting surface 81A. As indicated by a two-dot chain line in FIG. 1, when the opening/closing unit 9 has been pivoted about the opening/closing axis X9 such that a front end portion of the opening/closing unit 9 is moved in an up and a rear direction, the opening/closing unit 9 is switched to an open position in which the document supporting surface 81A is exposed outside. Accordingly, the user is able to put a document for reading on the document supporting surface 81A so as to be supported thereon.

As illustrated in FIGS. 1 and 2, on an upper portion of the opening/closing unit 9, there is provided a supply tray 9A capable of opening and closing. Further, a conveyor 4 is disposed in the opening/closing unit 9. The support tray 9A supports a plurality of sheets when the support tray 9A is opened. The conveyor 4 conveys the plurality of sheets one by one along a conveying path P1.

As illustrated in FIGS. 3 through 9, the reading unit 3 further comprises a reading sensor 3S, a carriage 20, a flat cable 50, and so on. The reading sensor 3S is an example of a reader. The carriage 20 is an example of a mover.

As illustrated in FIGS. 4 through 9, the base 10 is an injection molding product formed of thermoplastic resin. The base 10 has a generally box-like shape having a bottom wall surface 11, circumferential walls 12A, 12B, 12L, 12R, and so forth.

Figure 4:
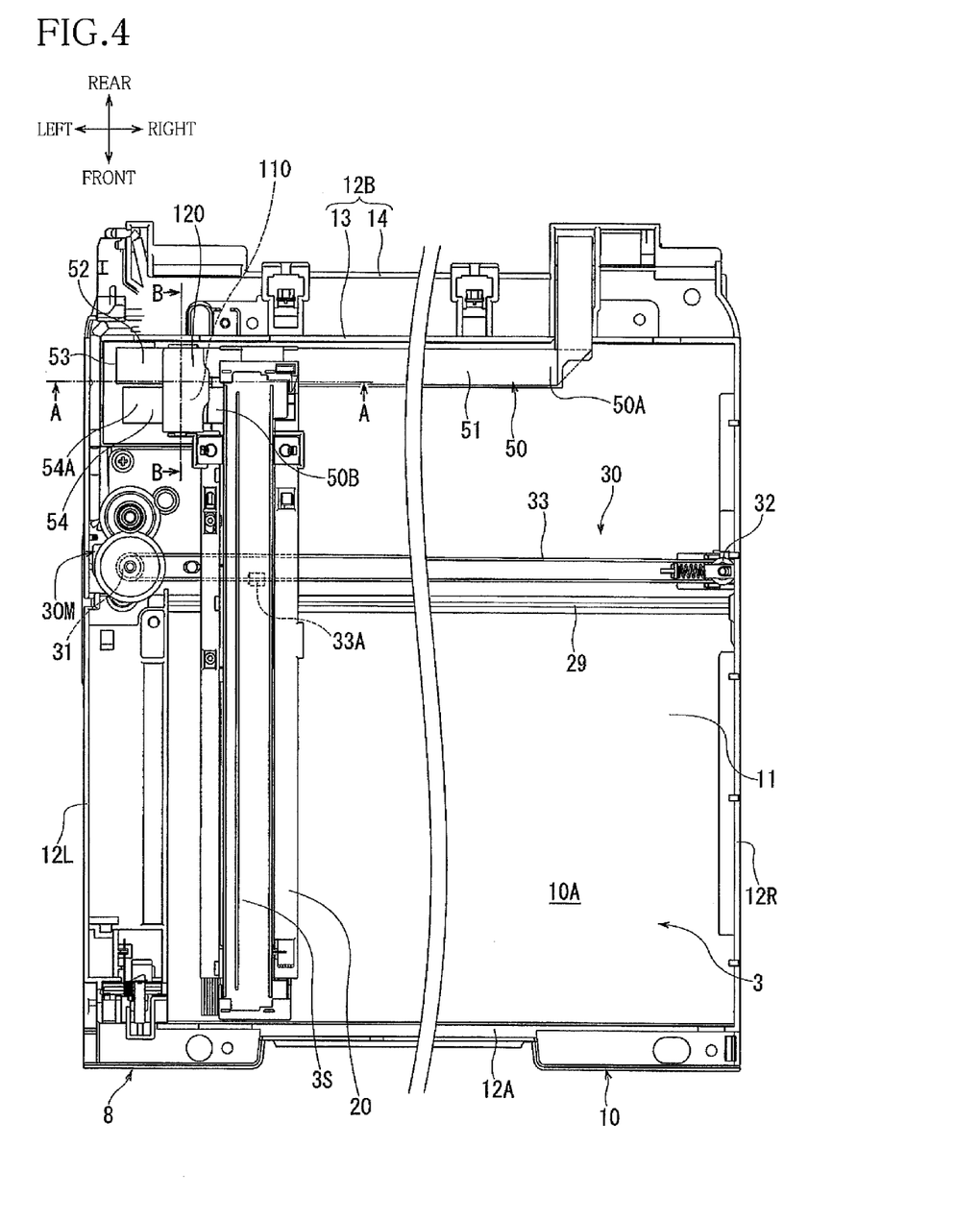
FIG. 4 is a plan view showing a base, a reading sensor, a carriage, a flat cable, a first holder and a second holder in the image reading apparatus in a state in which the platen glass is removed.

As illustrated in FIG. 4, the bottom wall surface 11 is a generally rectangular plane surface extending in a generally horizontal direction. The circumferential walls 12A, 12B, 12L, 12R extend upward from a front end, a rear end, a left end, a right end of the bottom wall surface 11, respectively. The rear circumferential wall 12B disposed on the rear end of the bottom wall surface 11 has a side wall 13 and an outer wall 14. The side wall 13 extends in the left-right direction. The outer wall 14 is located on a rear portion of the side wall 13 and extends in parallel with the side wall 13 and in the left-right direction. The hinge (not illustrated), which pivotably supports the opening/closing unit 9, is disposed between the side wall 13 and the outer wall 14. The front circumferential wall 12A disposed on the front end of the base 10, the left circumferential wall 12L disposed on the left end thereof, the right circumferential wall 12R disposed on the right end thereof and the side wall 13 enclose the bottom wall surface 11, and an accommodating area 10A is formed inside of the walls 12A, 12L, 12R, 13. The reading sensor 3S, the carriage 20, the flat cable 50 and a scanner 30 are accommodated in the accommodating area 10A. In other words, the reading sensor 3S, the carriage 20, the flat cable 50 and the scanner 30 are disposed in a space between the base 10 and the platen glass 81.

Figure 6:
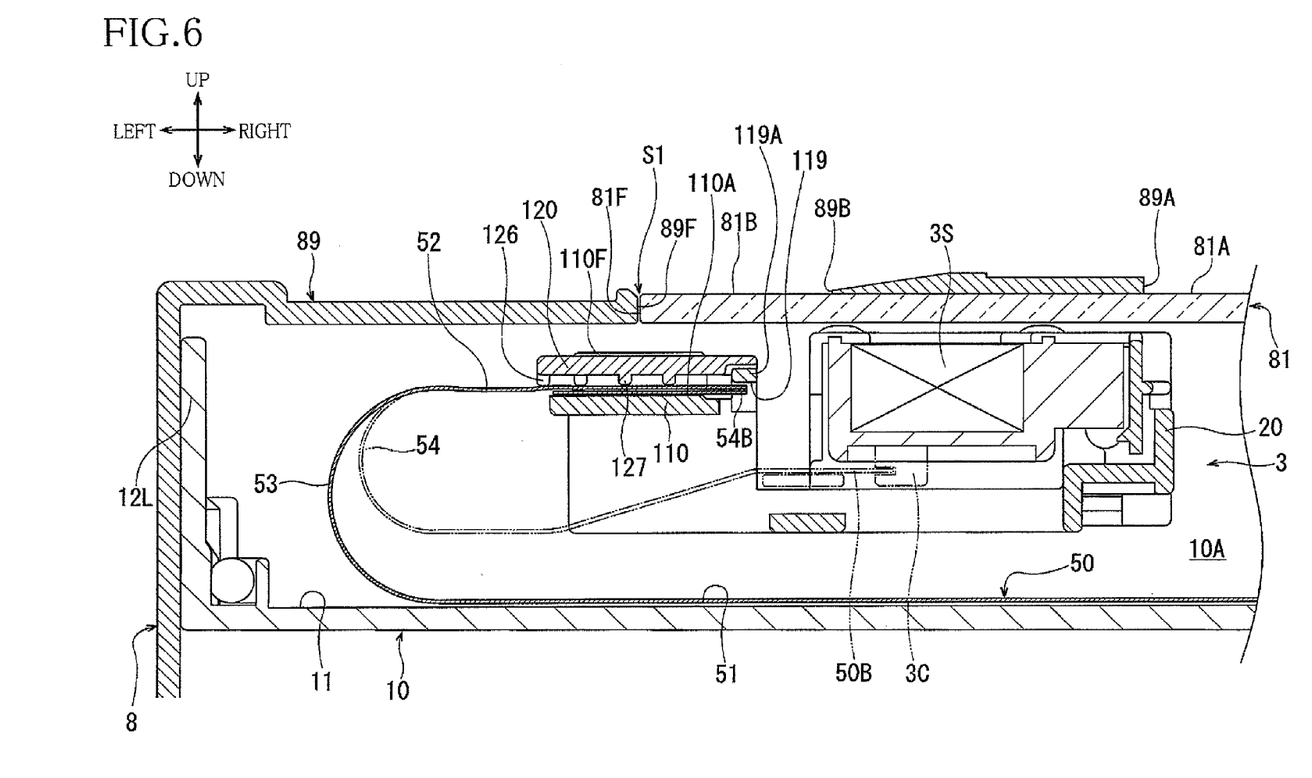
FIG. 6 is a partial cross-sectional view taken along a line A-A in FIG. 4.
Figure 7:
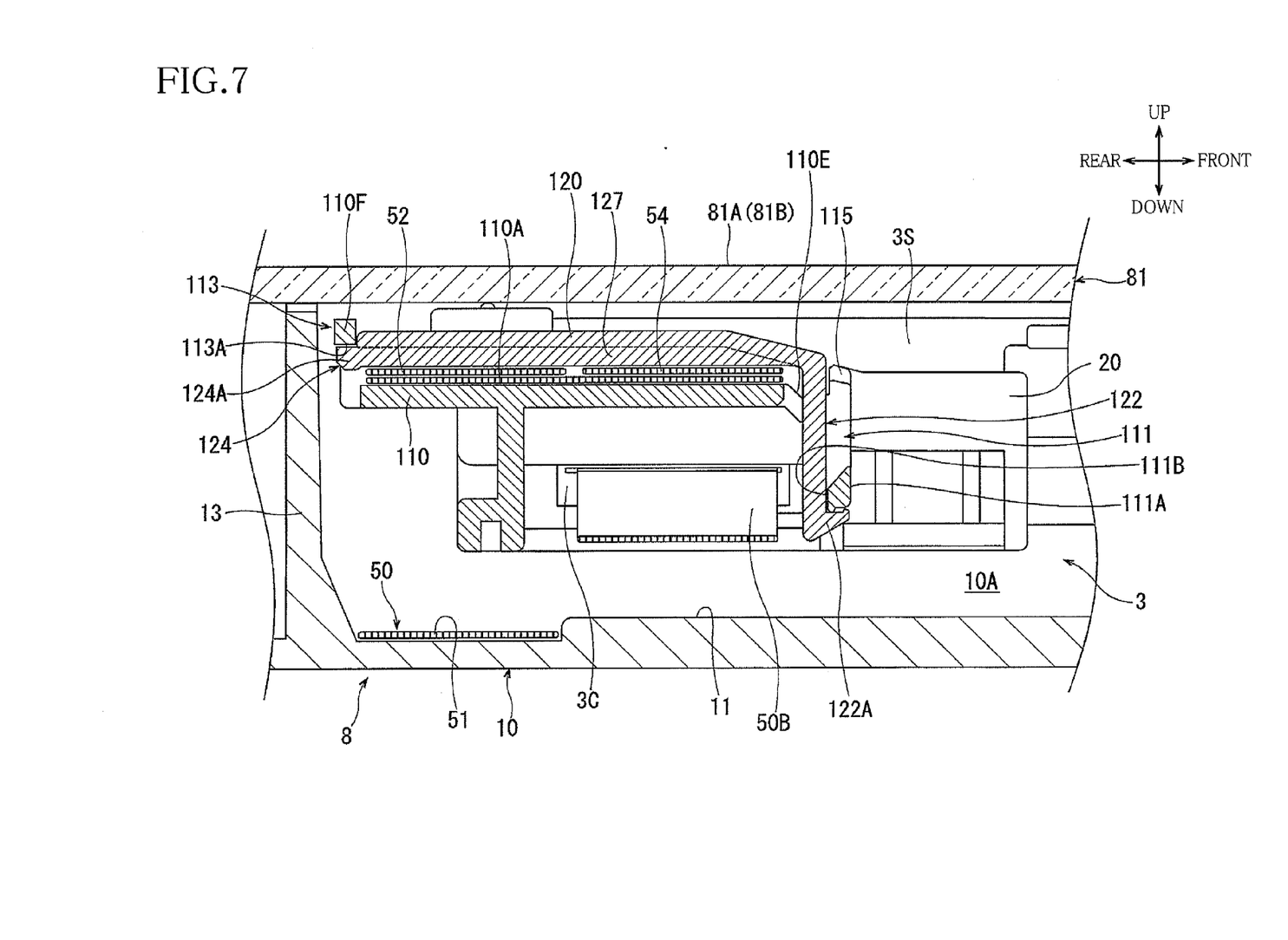
FIG. 7 is a partial cross-sectional view taken along a line B-B in FIG. 4.

As illustrated in FIGS. 3, 6 and 7, the platen glass 81 is fixed to the housing 8 in such a manner that, in a state in which a lower surface of the outer circumference 81E of the platen glass 81 is supported by the front circumferential wall 12A, the left circumferential wall 12L, the right circumferential wall 12R and the side wall 13, and in a state in which the frame 89 is held in contact with an upper surface of the outer circumference 81E of the platen glass 81 and the platen glass 81 is attached to the base 10. As illustrated in FIGS. 6 and 7, the platen glass 81 is opposed to the bottom wall surface 11 with a predetermined distance and covers the accommodating area 10A. The document supporting surface 81A is one of opposite surfaces of the platen glass 81 and the other surface (as an example of a second surface) of the platen glass 81, which is opposite to the document supporting surface 81A, faces the bottom wall surface 11 of the base 10.

As illustrated in FIG. 4, a guide rail 29 is disposed on the bottom wall surface 11 of the base 10. The guide rail 29 is located on a generally middle of the bottom wall surface 11 in the front-rear direction and extends in the left-right direction. A left end of the guide rail 29 is fixed to a lower portion of the left circumferential wall 12L. A right end of the guide rail 29 is fixed to a lower portion of the right circumferential wall 12R.

The left-right direction in which the guide rail 29 extends is an example of a sub scanning direction. A left end of an object is an example of a first end of the object in a sub scanning direction. A right end of an object is an example of a second end of the object in a sub scanning direction. Accordingly, the left circumferential wall 12L on the left end of the base 10, i.e., the left end of the base 10, is an example of a first end of a base in a sub scanning direction. The right circumferential wall 12R on the right end of the base 10, i.e., the right end of the base 10, is an example of a second end of a base in a sub scanning direction.

As illustrated in FIGS. 4 through 9, the carriage 20 is a member formed of resin and an elongated member extending in the front-rear direction. The carriage 20 extends from the vicinity of the front circumferential wall 12A to the vicinity of the side wall 13 on the rear end of the base 10. The carriage 20 is reciprocatably guided by the guide rail 29, above the bottom wall surface 11, in the left-right direction within a range extending from the vicinity of the left circumferential wall 12L to the vicinity of the right circumferential wall 12R.

As illustrated in FIGS. 2 through 9, the reading sensor 3S is held by the carriage 20. The reading sensor 3S is supported such that the reading sensor opposes to a lower surface of the platen glass 81 in the accommodating area 10A. The reading sensor 3S is a well-known image reading sensor such as a CIS (Contact Image Sensor), a CCD (Charge Coupled Device), and so on. The reading sensor 3S extends in the front-rear direction. The reading sensor 3S has a length that is greater than a length (a dimension in the front-rear direction) of a maximum sized-document (the document having the maximum size which can be read by the image reading apparatus 1) to be placed on the document supporting surface 81A.

The front-rear direction in which the reading sensor 3S extends is an example of a main scanning direction. A front end of an object is an example of a first end of the object in a main scanning direction. A rear end of an object is an example of a second end of the object in a main scanning direction. The front circumferential wall 12A, i.e., the front end of the base 10, is an example of a first end of a base in a main scanning direction. The rear circumferential wall 12B, i.e., the rear end of the base 10, is an example of a second end of a base in a main scanning direction. The main scanning direction and the sub scanning direction perpendicularly intersect with each other. The up-down direction is perpendicular to both of the main scanning direction and the sub scanning direction.

As illustrated in FIGS. 4 through 8, the flat cable 50 is formed of a plurality of covered electric wires which are connected to each other in a belt-like manner, and the flat cable 50 is flexible. As illustrated in FIG. 4, one end portion 50A of the flat cable 50 is located in the accommodating area 10A and is attached to the bottom wall surface 11. The one end portion 50A of the flat cable 50 is closer to the right circumferential wall 12R than to the left circumferential wall 12L and is adjacent to the side wall 13. The flat cable 50 extends from the one end portion 50A in such a manner as passing through the side wall 13 and the outer wall 14 and then the flat cable 50 is electrically coupled to a controller (not illustrated) that is disposed in the housing 8. As illustrated in FIGS. 6 and 7, a portion of the flat cable 50 nearer to the other end portion 50B of the flat cable 50 than to the one end portion 50A is held by the carriage 20, and a portion of the flat cable 50 extending toward the other end portion 50B is electrically coupled to the reading sensor 3S through a connector 3C.

Described in more detail, as illustrated in FIGS. 4 through 8, the flat cable 50 comprises a first extending portion 51, a curved portion 53, a second extending portion 52 and a bent portion 54.

As illustrated in FIGS. 4 and 6, the first extending portion 51 extends from the one end portion 50A of the flat cable 50, which is attached to the bottom wall surface 11, and extends in a direction toward the left end of the base 10 along the bottom wall surface 11. The curved portion 53 extends from the first extending portion 51, curved in a semicircular-arc shape to extend in a direction toward the platen glass 81, and then extends in a direction toward the right end of the base 10. The second extending portion 52 extends from the curved portion 53 in a direction toward the right end of the base 10 along the platen glass 81. The second extending portion 52 extends to the other end portion 50B of the flat cable 50 through the bent portion 54. In the present embodiment, one of opposite end portions of the second extending portion 52 that is closer to the other end portion 50B than to the one end portion 50A is a right end portion of the second extending portion 52.

Figure 8:
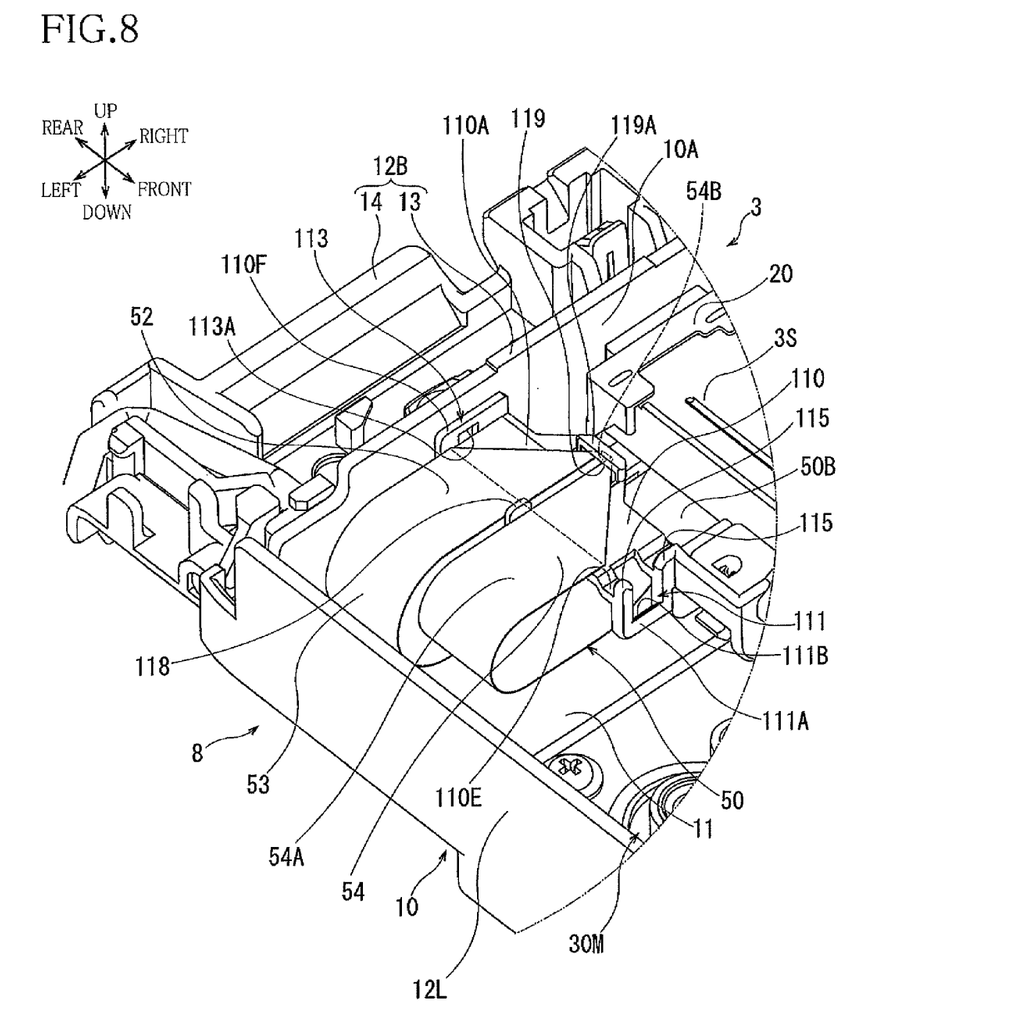
FIG. 8 is a partial perspective view showing the base, the reading sensor, the carriage, the flat cable and the first holder in the image reading apparatus in a state in which the platen glass and the second holder are removed.

As illustrated in FIG. 8, the bent portion 54 is formed in such a manner that the bent portion 54 extends from the right end portion of the second extending portion 52(as an example of a portion of a second extending portion) is bent and extends in a direction toward the front end of the base 10 (as an example of an end of a base in a main scanning direction) and then bent and extends in a direction toward the left end of the base 10 in parallel with the right end portion of the second extending portion 52. The bent portion 52 is then curved downward and rightward, and then extends in a direction toward the right end of the base 10, and extends to the other end portion 50B of the flat cable 50.

As illustrated in FIGS. 6 and 8, the flat cable 50 includes a protruding portion 54B as a part of the bent portion 54. The protruding portion 54B projects rightward at a position between the right end portion of the second extending portion 52 and a portion 54A of the bent portion 54 which extends leftward.

Figure 5:
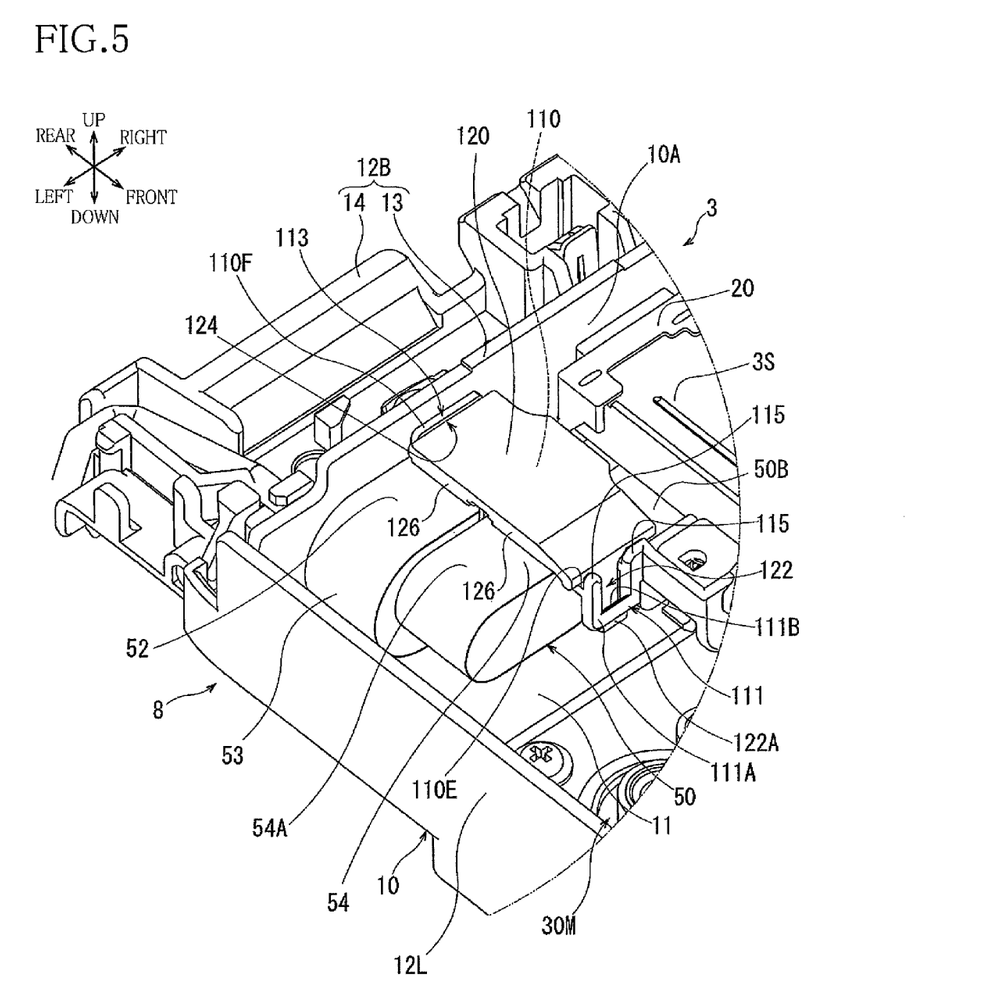
FIG. 5 is a partial perspective view showing the base, the reading sensor, the carriage, the flat cable, the first holder and the second holder in the image reading apparatus in the state in which the platen glass is removed.

As illustrated in FIGS. 5 and 6, since the flat cable 50 is flexible, the curved portion 53 is curved in a state of accumulating restoring force. The restoring force of the curved portion 53 applies the force to the first extending portion 51 of the flat cable 50 in a direction toward the bottom wall surface 11. Further the restoring force of the curved portion 53 applies the force to the second extending portion 52 in a direction toward the platen glass 81. Therefore, load is easily applied to the vicinity of the right end portion of the second extending portion 52. Especially in a case where a distance in the up-down direction between the base 10 and the platen glass 81 is smaller in order to reduce the size of the image reading apparatus 1, a curvature radius of the curved portion 53 becomes large. In this case, the restoring force of the curved portion 53 increases and it is likely to increase the load working on the vicinity of the right end portion of the second extending portion 52.

As illustrated in FIG. 4, the scanner 30 comprises a drive source 30M, a driving pulley 31, a driven pulley 32 and a timing belt 33.

The drive source 30M comprises an electric motor and a plurality of gears which mesh with the electric motor. The drive source 30M is adjacent to the left circumferential wall 12L and is located in the vicinity of a left end of the guide rail 29. The drive source 30M is driven by the controller (not illustrated) to be rotated.

The driving pulley 31, indicated by a broken line in FIG. 4, is integrally formed with one of the plurality of gears of the drive source 30M which is the farthest away from the electric motor. The driving pulley 31 is adjacent to the left circumferential wall 12L and is located on a rear portion of the left end of the guide rail 29. The driving pulley 31 is rotatable about a rotation axis extending in the up-down direction.

The driven pulley 32 is adjacent to the right circumferential wall 12R and is located on a rear portion of the right end of the guide rail 29. The driven pulley 32 is rotatable about a rotation axis extending in the up-down direction.

The timing belt 33 is an endless belt wound on the driving pulley 31 and the driven pulley 32. The carriage 20 is attached to a portion of the timing belt 33 which extends in the left-right direction along the guide rail 29 through a connecting portion 33A.

When the driving pulley 31 is rotated in a normal direction, the connecting portion 33A of the timing belt 33 is moved in a right direction. When the driving pulley 31 is rotated in a reverse direction, the connecting portion 33A is moved in a left direction. With the movement of the connecting portion 33A in the right direction or in the left direction, the carriage 20 is moved in the right direction or in the left direction. The carriage 20 and the reading sensor 3S carried by the carriage 20 are capable of reciprocating in the left-right direction in the accommodating area 10A with the normal or the reverse rotation of the driving pulley 31.

When the carriage 20 is moved rightward, the second extending portion 52 of the flat cable 50 is pulled such that the curved portion 53 is moved toward the right end of the base 10, and the first extending portion 51 becomes shorter and the second extending portion 52 becomes longer. On the other hand, when the carriage 20 is moved leftward, the second extending portion 52 of the flat cable 50 is pushed such that the curved portion 53 is moved toward the left end of the base 10, and the first extending portion 51 becomes longer, while the second extending portion 52 becomes shorter. Accordingly, the flat cable 50 follows the reciprocating movement of the carriage 20 and does not interrupt image reading operation by the reading sensor 3S.

As illustrated in FIGS. 4 through 11, in order to cause the carriage 20 to hold the right end portion of the second extending portion 52 of the flat cable 50 and the portion of the bent portion 54, the image recording apparatus 1 comprises a first holder 110, a second holder 120, a first engaging portion 111, a second engaging portion 122, a third engaging portion 113 and a fourth engaging portion 124. The first engaging portion 111, the second engaging portion 122, the third engaging portion 113 and the fourth engaging portion 124 are an example of an engager.

As illustrated in FIGS. 6 through 9, the first holder 110 is located on a rear end portion of the carriage 20 (as an example of an end portion of a reader) and is integrally formed with the carriage 20. The second holder 120 is a separate member from the first holder 110 and is formed of resin. The second holder 120 is engaged with the first holder 110 by the first engaging portion 111, the second engaging portion 122, the third engaging portion 113 and the fourth engaging portion 124. The second holder 120 is attached to the rear end portion of the carriage 20 at a position where the second holder 120 is opposed to the first holder 110.

Figure 9:
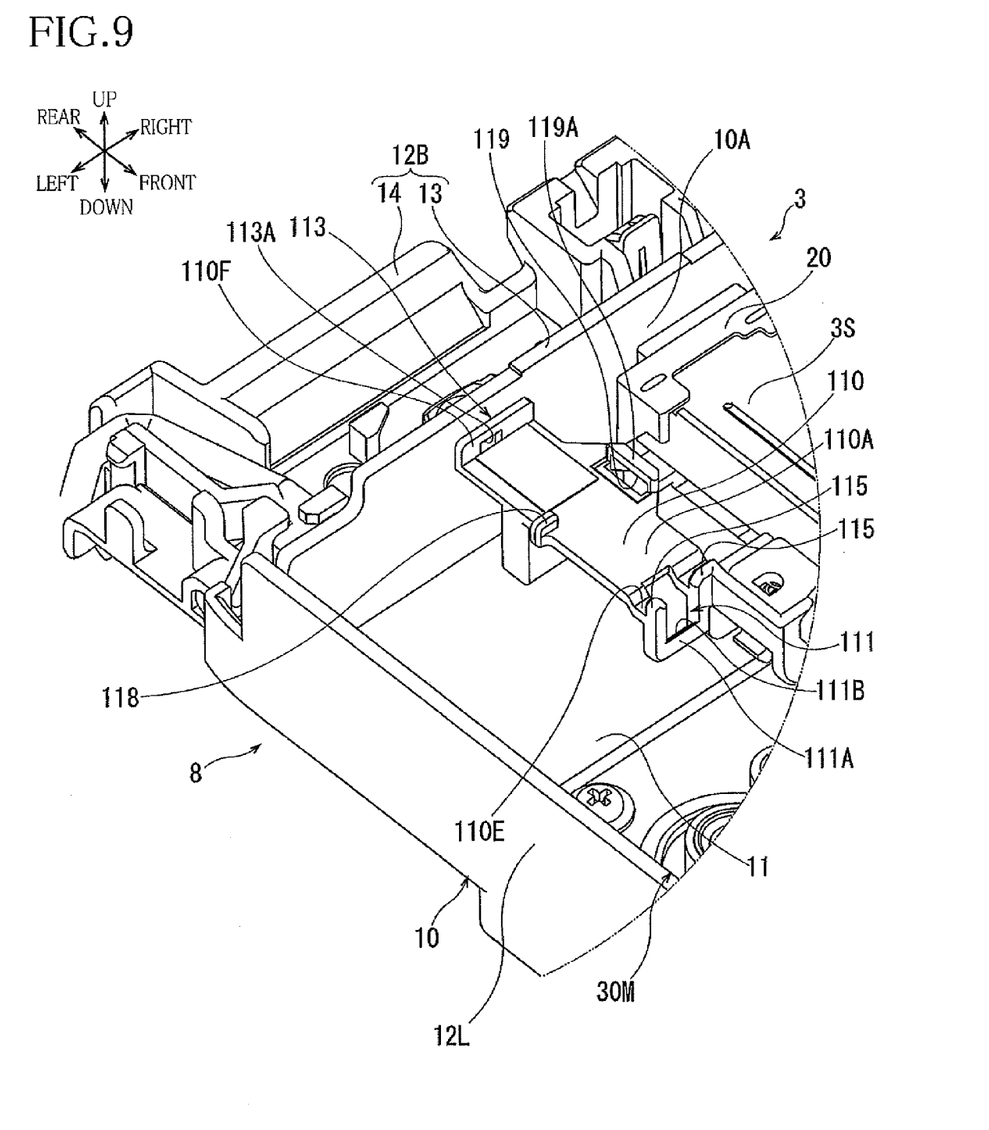
FIG. 9 is a partial perspective view showing the base, the reading sensor, the carriage and the first holder in the image reading apparatus in a state in which the platen glass, the second holder and the flat cable are removed.

As illustrated in FIGS. 6 and 9, the first holder 110 projects in the left direction relative to a position where the carriage 20 holds the recording sensor 3S. The first holder 110 has a first holding surface 110A. The first holding surface 110A is a flat surface facing upward and extending in the up-down direction and in the left-right direction at a position spaced apart from the rear end portion of the reading sensor 3S carried by the carriage 20 in the left direction. The first holding surface 110A has a rectangular shape extending in the front-rear direction along the main scanning direction of the reading sensor 3S.

As illustrated in FIGS. 6 through 8, the first holding surface 110A of the first holder 110 is held in contact with a lower surface (i.e., one of opposite surfaces of the flat cable 50 which faces the base 10, and as an example of a third surface of a flat cable) of the right end portion of the second extending portion 52 of the flat cable 50 and a lower surface (one of opposite surfaces of the flat cable 50 which faces the base 10) of the portion of the bent portion 54. The first holder 110 holds the right end portion of the second extending portion 52 and the portion of the bent portion 54.

As illustrated in FIGS. 6, 8 and 9, the first holder 110 comprises a accommodating portion 119. The accommodating portion 119 has an opening formed by a surface extending in the right direction from the first holding surface 110A and a pressing portion 119A which is formed to have a space for accommodating the protruding portion 54B of the flat cable 50. The pressing portion 119A is integrally formed with the first holder 110. The protruding portion 54B of the flat cable 50 is inserted into a left end of the first holding surface 110A in the right direction and then accommodated in the accommodating portion 119.

As illustrated in FIGS. 8 and 9, a spacer 118 is formed on a left end portion of the first holding surface 110A of the first holder 110. The spacer 118 is formed on a generally middle of the first holding surface 110A in the front-rear direction and protrudes upward in a rib-like manner. The spacer 118 keeps a space in the front-rear direction of the right end portion of the second extending portion 52 and the portion of the bent portion 54, and prevents the right end portion of the second extending portion 52 and the portion of the bent portion 54 from displacement on the first holding surface 110A.

As illustrated in FIGS. 5 and 7 through 9, the first engaging portion 111 is formed in a front end portion (as an example of a first end portion of the first holder) of the first holding surface 110A of the first holder 110. The first engaging portion 111 includes a wall portion 110E extending frontward and downward from a front end of the first holding surface 110A. The wall portion 110E has a recess in a middle of the wall portion 110E in the left-right direction and has a left end portion and a right end portion. There is formed a wall portion 111A on a front end of the wall portion 110E. The wall portion 111A is a wall extending in the up-down direction and an upper end of the wall portion 111A is open so as to have a generally U-shape. In other words, the wall portion 111A has a recess in a middle of the wall portion 111A in the left-right direction and has a left end portion and a right end portion. In the first engaging portion 111, the left end portion of the wall portion 110E is connected to the left end portion of the wall portion 111A, while the right end portion of the wall portion 110E is connected to the right end portion of the wall portion 111A, and therefore, there is formed an opening 111B extending through the first engaging portion 111 in the up-down direction in a space defined by the left end portion and the right end portion of the wall portion 110E and the left end portion and the right end portion of the wall portion 111A. The opening 111B is an example of a first recess. The first engaging portion is integrally formed with the first holder 110.

As illustrated in FIGS. 7 through 9, the third engaging portion 113 is formed on a rear end portion (as an example of a second end portion of the first holder) of the first holding surface 110A of the first holder 110. The third engaging portion 113 includes a wall portion 110F protruding slightly upward from a rear end of the first holding surface 110A. A recess 113A is formed in the wall portion 110F. The recess 113A is a rectangular hole extending through the wall portion 110F in the front-rear direction. The recess 113A is an example of a second recess. The third engaging portion 113 is integrally formed with the first holder 110.

Limiting portions 115, 115 are formed on the front end portion of the first holding surface 110A of the first holder 110 (as an example of a first end portion of a first holder in which a first engaging portion is disposed). Each of the limiting portions 115, 115 is an example of a contacting portion. Each of the limiting portions 115, 115 is a rib formed by an upper end of the wall portion 111A of the first engaging portion 111 which has a generally U-shape. Each of the limiting portions protrudes upward at a position upper than the front end of the first holding surface 110A. Each of the (left) limiting portion 115 located on a left portion of the first holding surface 110A and the (right) limiting portion 115 located on a right portion of the first holding surface 110A is spaced apart from the first holding surface 110A by the same distance in the front direction. The opening 111B is interposed between the left limiting portion 115 and the right limiting portion 115 in the left-right direction.

Regarding an explanation of the second holder 120, the second holder 120 is described based on the front-rear direction, the up-down direction, and the left-right direction of the second holder 120 defined when the second holder 120 engages with the first holder 110 as illustrated in FIGS. 4 through 7.

Figure 10:
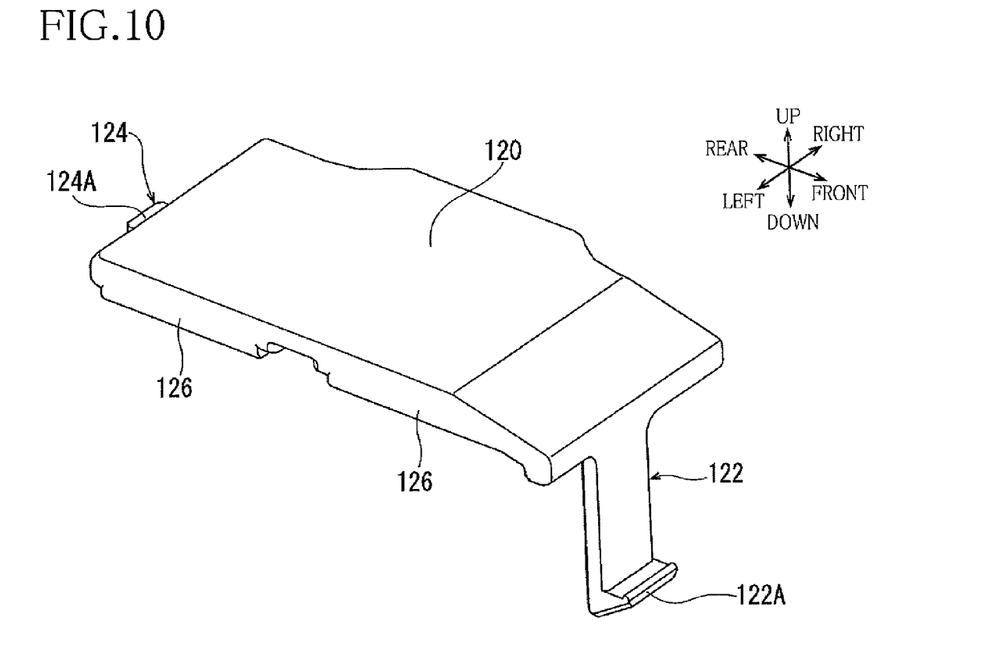
FIG. 10 is a perspective view of the second holder in the image reading apparatus.
Figure 11:
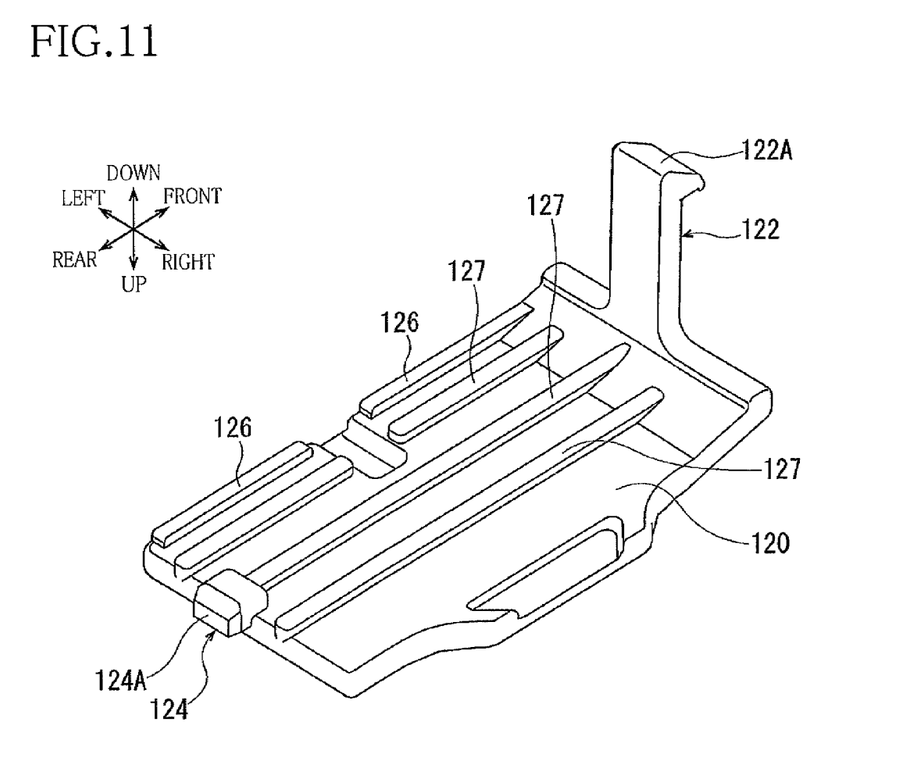
FIG. 11 is a perspective view of the second holder in the image reading apparatus.

As illustrated in FIGS. 10, 11, the second holder 120 is a plate member extending in the front-rear direction and in the left-right direction. The second holder 120 has a rectangular shape elongated in the front-rear direction.

The second engaging portion 122 is formed on a front end portion (as an example of a first end portion of a second holder) of the second holder 120. The second engaging portion 122 has a hook 122A. The hook 122A extends from a front end of the second holder 120 in generally parallel with the up-down direction and protrudes downward. A lower end portion of the hook 122A protrudes frontward. The lower end portion of the hook 122A is capable of flexural deformation in the front-rear direction.

The fourth engaging portion 124 is formed on a rear end portion (as an example of a second end portion of a second holder) of the second holder 120. The fourth engaging portion 124 has a protruding portion 124A. The protruding portion 124A has a prismatic shape extending rearward from a rear end of the second holder 120.

Extending portions 126, 126 are formed on a left end of the second holder 120 (as an example of an end portion of a second holder in a sub scanning direction closer to the first end of the base than the other end portion of the second holder). Each of the extending portions 126 protrudes downward and extends in a rib-like manner in the front-rear direction.

As illustrated in FIG. 11, a plurality of ribs 127 are arranged in the left-right direction on the lower surface of the second holder 120. Each of the plurality of ribs 127 protrudes downward, that is each of the plurality of ribs 127 protrudes in a direction toward the first holder 110, and extends in the front-rear direction.

The second holder 120 is attached to the first holder 110 in the following manner. As illustrated in FIG. 8, in a state in which the first holding surface 110A of the first holder 110 is held in contact with the lower surface of the right end portion of the second extending portion 52 of the flat cable 50 and the lower surface of the portion of the bent portion 54 of the flat cable 50, and in a state in which the accommodating portion 119 accommodates the protruding portion 54B of the flat cable 50, the second holder 120 is moved downward such that the second holder 120 approaches the first holder 110. Then, as illustrated in FIGS. 5 and 7, the right end portion of the second extending portion 52 and the portion of the bent portion 54 are interposed between the first holder 110 and the second holder 120 and are held by the first holder 110 and the second holder 120. The right end portion of the second extending portion 52 is an example of a portion of a second extending portion.

In a state in which the right end portion of the second extending portion 52 and the portion of the bent portion 54 are held by the first holder 110 and the second holder 120, when the second holder 120 is shifted rearward, as illustrated in FIG. 7, the protruding portion 124A of the fourth engaging portion 124 is inserted into the recess 113A of the third engaging portion 113. The shift of the second holder 120 is stopped when the rear end of the second holder 120 comes into contact with the wall portion 110F of the first holder 110.

At the same time, when the front end portion of the second holder 120 is moved downward and the hook 122A of the second engaging portion 122 is inserted into the opening 111B of the first engaging portion 111. The hook 122A protrudes downward from a lower end portion of the wall portion 111A of the first holder 110 while deforming and the hook 122A engages with the lower end portion of the wall portion 111A.

When the first engaging portion 111 thus engages with the second engaging portion and the third engaging portion 113 thus engages with the fourth engaging portion 124, as illustrated in FIGS. 6 and 7, the plurality of ribs 127 of the second holder 120, which protrude toward the first holding surface 110A, are held in contact with the upper surface, i.e., one of opposite surfaces which faces the platen glass, of the right end portion of the second extending portion 52 and the upper surface of the portion of the bent portion 54. The second holder 120 holds the right end portion of the second extending portion 52 and the portion of the bent portion 54 together with the first holding surface 110A of the first holder 110. The upper surface of the flat cable 50 is an example of a fourth surface of a flat cable.

In the above-described state, as illustrated in FIGS. 5 and 7, the limiting portions 115, 115 are held in contact with a front surface of a front end portion (i.e., an end portion of a second holder closer to the second engaging portion 122 than the other end portion, and an example of a first end portion of a second holder in which a second engaging portion is disposed) of the second holder 120 so as to limit the second holder 120 to moving frontward. As illustrated in FIG. 6, each extending portion 126 protrudes in a direction toward the base 10 at a position where the extending portion 126 is farther away in the left direction from the reading sensor 3S than the first holder 110. Accordingly, the extending portion 126 causes the second extending portion 52 of the flat cable 50 to be bent in a direction away from the platen glass 81 at a position between the first holder 110 and the curved portion 53.

As illustrated in FIG. 6, a space S1 is formed between an end surface 81F as a part of the outer circumference of the platen glass 81 and an end surface 89F as a part of the second opening 89B of the frame 89. Through the space S1, a space facing the document supporting surface 81A of the platen glass 81 (a space located on a document supporting surface 81A side of the platen glass) and a space facing a back surface (a surface opposite to the document supporting surface 81A) of the platen glass 81 (a space located on a back surface side of the platen glass) are communicated with each other.

A position where the carriage 20 and the reading sensor 3S are disposed as illustrated in FIG. 6 is a waiting position. In a state in which the carriage 20 and the reading sensor 3S are stayed at the waiting position, the first holder 110 is located in the vicinity of the space S1. In this state, the second holder 120 is located at a position between the first holder 110 and the space S1, and covers the first holder 110 (i.e., the right end portion of the second extending portion 52 and the portion of the bent portion 54 of the flat cable 50).

<Image Reading Operation>

As illustrated in FIG. 2, when the image reading apparatus 1 reads a document placed on the document supporting surface 81A, the scanner 30 is driven to move the reading sensor 3S carried by the carriage 20 rightward. The reading sensor 3S thus reads the image on the document placed on the document supporting surface 81A. After that, the scanner 30 moves the reading sensor 3S which has completed the image reading leftward to return to an original position (the waiting position).

Further, when the image reading apparatus 1 reads the image on each of the plurality of sheets supported on the supply tray 9A, the scanner 30 is driven to move the reading sensor 3S carried by the carriage 20 leftward and to stop the reading sensor 3S at a predetermined reading position where the reading sensor 3S opposes to a lower surface of the reading surface 81B. And, when each of the sheets supported on the supply tray 9A is conveyed in order along the conveying path P1 by the conveyor 4, each sheet passes above the reading sensor 3S positioned at the predetermined reading position and the reading sensor 3S reads image on the sheet passing above the reading sensor 3S.

<Effects>

In the image reading apparatus 1, the first holder 110 provided on the carriage 20 is held in contact with the lower surface of the right end portion of the second extending portion 52 of the flat cable 50 and the lower surface of the portion of the bent portion 54, and the first holder 110 holds the right end portion of the second extending portion 52 and the portion of the bent portion 54. The second holder 120 is held in contact with the upper surface of the right end portion of the second extending portion 52 of the flat cable 50 and the upper surface of the portion of the bent portion 54, and the second holder 120 holds the right end portion of the second extending portion 52 of the flat cable 50 and the portion of the bent portion 54 together with the first holder 110. In other words, the right end portion of the second extending portion 52 and the portion of the bent portion 54 are sandwiched between the first holder 110 and the second holder 120 in the up-down direction. Therefore, in the image reading apparatus 1, when the second extending portion 52 of the flat cable 50 is pushed or pulled with the reciprocating movement of the carriage 20, or when the second extending portion 52 is pushed in the direction toward the platen glass 81 by the restoring force of the curved portion 53, the right end portion of the second extending portion 52 and the bent portion 54 is maintained in a state in which the right end portion of the second extending portion 52 and the bent portion 54 are held by the first holder 110 and the second holder 120.

Especially in the image reading apparatus 1, since the opening 111B of the first engaging portion 111 engages with the hook 122A of the second engaging portion 122, and the recess 113A of the third engaging portion 113 engages with the protruding portion 124A of the fourth engaging portion 124. Accordingly, it is surely maintained that the right end portion of the second extending portion 52 and the portion of the bent portion 54 are held by the first holder 110 and the second holder 120.

In the image reading apparatus 1, it may be avoided that the right end portion of the second extending portion 52 and the portion of the bent portion 54 are displaced from a desired position. Therefore, it hardly occurs that the flat cable 50 contacts the platen glass 81 and the flat cable 50 interrupts the reciprocating movement of the carriage 20.

The image reading apparatus 1 restrains deterioration in the image-reading quality by the image sensor 3S caused by the flat cable 50.

Furthermore, in the image reading apparatus 1, the first engaging portion 111 and the third engaging portion 113 are integrally formed in the first holder 110, and the second engaging portion 122 and the fourth engaging portion 124 are integrally formed in the second holder 120. Accordingly, compared to a case where there is adopted an engaging portion which is separately formed from the first holder 110 and the second holder 120, and a case where the first holder 110 engages with the second holder 120 by the separate engaging portion, the present embodiment may reduce the number of components. Therefore, the image reading apparatus 1 is capable of reducing the manufacturing cost.

Moreover, in the image reading apparatus 1, when the right end portion of the second extending portion 52 and the portion of the bent portion 54 are held between the first holder 110 and the second holder 120, the second holder 120 is moved downward toward the first holder 110, and the second holder 120 is moved rearward. It allows the engagement of the opening 111B of the first engaging portion 111 and the hook 122A of the second engaging portion 122 and the engagement of the recess 113A of the third engaging portion 113 and the protruding portion 124A of the fourth engaging portion 124 to be simultaneously performed. Further, in the image reading apparatus 1, such a mechanism that the right end portion of the second extending portion 52 and the portion of the bent portion 54 are held by the first holder 110 and the second holder 120 is easily and accurately realized by the engagement of the opening 111B formed in the first holder 110 and the hook 122A formed in the second holder 120.

In the image reading apparatus 1, as illustrated in FIGS. 6 and 7, the hook 122A formed in the front end portion of the second holder 120 does not project in the rear direction from a rear end portion of the reading sensor 3S. Further, the protruding portion 124A formed in the rear end portion of the second holder 120 is smaller than the hook 122A. Therefore, the image reading apparatus 1 enjoys downsizing of the apparatus in the front-rear direction.

Furthermore, in the image reading apparatus 1, as illustrated in FIGS. 5 and 7, in the state in which the first engaging portion 111 engages with the second engaging portion 122 and the third engaging portion 113 engages with the fourth engaging portion 124, the limiting portions 115, 115 formed in the first holder 110 are held in contact with the front end portion (one of opposite end portions that is closer to the second engaging portion 122 than the other end portion) of the second holder 120 to limit the second holder 120 to moving frontward. It allows the second holder 120 to be accurately located relative to the first holder 110. Therefore, in the image reading apparatus 1, even when load such as impact is applied to the second holder 120, the second holder 120 is hardly displaced with respect to the first holder 110. The result is that the state in which the right end portion of the second extending portion 52 and the portion of the bent portion 54 is held between the first holder 110 and the second holder 120 is surely maintained.

Further, in the image reading apparatus 1, as illustrated in FIGS. 6 and 11, the extending portion 126 formed on the left end of the second holder 120 is located on a left portion of the first holder 110 and protrudes in the direction toward the base 10. Accordingly, the extending portion 126 causes the second extending portion 52 of the flat cable 50 to be bent at the position between the first holder 110 and the curved portion 53 in the direction away from the platen glass 81. The image reading apparatus 1 restrains the second extending portion 52 from being excessively close to the platen glass 81.

Furthermore, in the image reading apparatus 1, as illustrated in FIGS. 6, 7 and 11, the plurality of ribs 127 formed on the lower surface of the second holder 120 are surely in contact with the right end portion of the second extending portion 52 and the portion of the bent portion 54, so that the right end portion of the second extending portion 52 and the portion of the bent portion 54 are accurately held by the first holder 110 and the second holder 120.

In the image reading apparatus 1, since the flat cable 50 has the bent portion 54, the flat cable 50 is efficiently disposed within a limited space in the base 10. The first holder 110 and the second holder 120 are capable of surely holding the right end portion of the second extending portion 52 and the portion of the bent portion 54 that are likely to rise in the direction toward the platen glass 81. Further, in the image reading apparatus 1, as illustrated in FIGS. 6 and 8, since the accommodating portion 119 formed in the first holder 110 accommodates the protruding portion 54B of the flat cable 50, the right end portion of the second extending portion 52 and the portion of the bent portion 54 are temporarily fastened to the first holder 110. Therefore, in a process that the first holder 110 and the second holder 120 nip and hold the right end portion of the second extending portion 52 and the portion of the bent portion 54, the right end portion of the second extending portion 52 and the portion of the bent portion 54 are hard to be shifted from the first holder 110 and the second holder 120.

In the image reading apparatus 1, as illustrated in FIG. 6, since the space S1 is formed in at least a part within a range between the outer circumference 81E and the frame 89, it is possible that discharged spark of static electricity intrudes from the space facing the document supporting surface 81A into the space facing the back surface of the platen glass 81 through the space S1. In the image reading apparatus 1, in the state in which the carriage 20 and the reading sensor 3A are stopped at the waiting position, the first holder 110 is positioned in the vicinity of the space S1. In this state, the second holder 120 is positioned at a position between the first holder 110 and the space S1, and covers the first holder 110. Therefore the second holder 120 prevents the discharged spark from reaching the right end portion of the second extending portion 52 and the bent portion 54 which are held by the first holder 110 and the second holder 120. It allows the image reading apparatus 1 to prevent an electronic device that is connected to the flat cable 50 from being damaged by the discharged spark of static electricity.

The present invention is not limited to the illustrated embodiment. It is to be understood that the present invention may be embodied with various changes and modifications that may occur to a person skilled in the art, without departing from the spirit and scope of the invention defined in the appended claims.

In the illustrated embodiment, the first engaging portion 111 and the third engaging portion 113 are formed in the first holder 110, and the second engaging portion 122 and the fourth engaging portion 124 are formed in the second holder 120, but the present invention is not limited to this structure. For example, instead of the second engaging portion 122 and the fourth engaging portion 124, resin-made hinge may be integrally formed with a rear end portion of the first holder 110 and a rear end portion of the second holder 120. Further, an engaging portion may be a separate member from a first holder and a second holder, e.g., a screw for engaging and so on. Furthermore, an engaging portion similar to the hook 122A in the illustrated embodiment may protrude from a first holder toward a supporter, an opening similar to the opening 111B in the illustrated embodiment is formed in a second holder, and the engaging portion may be engaged with the opening. Furthermore, a protruding portion similar to the protruding portion 124A may protrude from a first holder, a recess similar to the recess 113A may be formed in a second holder, and the protruding portion may be engaged with the recess.

The present invention is applicable to an image reading apparatus, a Multi Function Device (MFD) and so forth.

What is claimed is:

1. An image reading apparatus, comprising:
a base;
a supporter spaced apart from the base and having a first surface and a second surface opposite to the first surface, the first surface supporting a reading object, the second surface facing the base;
a reader disposed between the base and the supporter and extending in a main scanning direction, the reader being configured to read an image of the reading object supported on the first surface of the supporter;
a mover configured to reciprocate, in a space between the base and the supporter, in a sub scanning direction while holding the reader, the sub scanning direction being perpendicular to the main scanning direction;
a flexible flat cable,
a first holder provided on the mover and configured to hold a portion of the flat cable in a state in which the first holder is held in contact with a third surface of the flat cable, the third surface facing the base;
a second holder configured to hold the portion of the flat cable together with the first holder in a state in which the second holder is held in contact with a fourth surface of the flat cable, the fourth surface being opposite to the third surface of the flat cable; and
an engager configured to engage between the first holder and the second holder;
wherein the engager comprises a first engaging portion provided on the first holder, and a second engaging portion provided on the second holder and engageable with the first engaging portion.

2. The image reading apparatus according to claim 1,
wherein one of the first engaging portion and the second engaging portion comprises a hook extending in a direction perpendicular to both of the main scanning direction and the sub scanning direction, and
the other of the first engaging portion and the second engaging portion comprises a first recess engageable with the hook.

3. The image reading apparatus according to claim 2,
wherein the first holder and the second holder are located at an end portion of the reader in the main scanning direction,
wherein the first engaging portion is disposed in a first end portion of the first holder, and the second engaging portion is disposed in a first end portion of the second holder, the first end portion of the first holder being one of the first end portion and a second end portion of the first holder in the main scanning, the first end portion of the second holder being one of the first end portion and a second end portion of the second holder in the main scanning direction and is closer to the first end portion of the first holder than the second end portion of the second holder.

4. The image reading apparatus according to claim 3,
wherein the first holder and the second holder are separately formed,
wherein the engager further comprises a third engaging portion disposed in the second end portion of the first holder, and a fourth engaging portion disposed in the second end portion of the second holder and engageable with the third engaging portion,
wherein one of the third engaging portion and the fourth engaging portion comprises a protruding portion protruding in the main scanning direction, and the other of the third engaging portion and the fourth engaging portion comprises a second recess engageable with the protruding portion and recessed in the main scanning direction.

5. The image reading apparatus according to claim 4,
wherein a contact portion is provided on the first end portion of the first holder in which the first engaging portion is disposed,
wherein the contact portion is capable of being held in contact with the first end portion of the second holder in which the second engaging portion is disposed, in a state in which the first engaging portion engages with the second engaging portion, and in a state in which the third engaging portion engages with the fourth engaging portion.

6. The image reading apparatus according to claim 1,
wherein a projecting portion is provided on an end portion of the second holder in the sub scanning direction, the end portion of the second holder in the sub scanning direction on which the projecting portion is provided being an end portion of the second holder closer to the first end of the base than the other end portion of the second holder, the projecting portion projecting in a direction toward the base, the projecting portion being located farther apart from the reader than the first holder in the sub scanning direction.

7. The image reading apparatus according to claim 1,
wherein a rib is formed on a surface of the second holder facing the base, the rib protruding toward the first holder and extending in the main scanning direction, the rib being capable of being held in contact with the portion of the second extending portion.

8. The image reading apparatus according to claim 1,
wherein the flat cable comprises an attached portion attached to the base and an end portion coupled to the reader,
the flat cable, at a position between the attached portion and the end portion, further comprising:
a first extending portion extending in a direction toward a first end of the base that is one of opposite ends of the base in the sub scanning direction;
a curved portion extending from the first extending portion and curved in a direction toward the supporter and then curved in a direction toward a second end of the base that is the other of the opposite ends of the base in the sub scanning direction; and
a second extending portion extending from the curved portion in the direction toward the second end of the base.

9. The image reading apparatus according to claim 8,
wherein the flat cable further comprises a bent portion extending from the portion of the second extending portion and bent in such a manner as extending toward an end of the base in the main scanning direction, and then bent in such a manner as extending toward the first end of the base in the sub scanning direction in parallel with the second extending portion and,
wherein the first holder is configured to further hold at least a portion of the bent portion in the state in which the first holder is held in contact with the third surface of the flat cable,
wherein the second holder is configured to further hold the at least the portion of the bent portion together with the first holder in the state in which the second holder is held in contact with the fourth surface of the flat cable.

10. The image reading apparatus according to claim 9,
wherein the flat cable comprises a third protruding portion, as a portion of the bent portion, located at a position between the portion of the second extending portion and a portion of the bent portion extending toward the first end of the base in the sub scanning direction, configured to protrude toward the second end of the base in the sub scanning direction,
wherein the first holder comprises a accommodating portion configured to accommodate the protruding portion.

11. The image reading apparatus according to claim 1,
further comprising a frame located around an outer circumference of the supporter,
wherein a first space is formed between the outer circumference of the supporter and the frame, a space formed on a first surface side of the supporter being communicatable with a space formed on a second surface side of the supporter via the first space, and
wherein, when the first holder is located in a vicinity of the first space, the second holder is located between the first space and the first holder and is configured to cover the first holder.

12. An image reading apparatus, comprising:
a base;
a supporter spaced apart from the base and having a first surface and a second surface opposite to the first surface, the first surface supporting a reading object, the second surface facing the base;
a reader disposed between the base and the supporter and extending in a main scanning direction, the reader being configured to read an image of the reading object supported on the first surface of the supporter;
a mover configured to reciprocate, in a space between the base and the supporter, in a sub scanning direction while holding the reader, the sub scanning direction being perpendicular to the main scanning direction;

a flexible flat cable coupled to the reader, a part of which positioned in a vicinity of the reader being a folded portion which comprises a base-facing surface and a supporter-facing surface;

a first holder provided on the mover and configured to hold the folded portion of the flat cable in a state in which the first holder is held in contact with the base-facing surface of the folded portion, the base facing surface facing the base;

a second holder configured to hold the folded portion of the flat cable together with the first holder in a state in which the second holder is held in contact with the supporter-facing surface of the folded portion, the supporter-facing surface facing the supporter; and an engager configured to engage between the first holder and the second holder;

wherein the engager comprises a first engaging portion provided on the first holder and a second engaging portion provided on the second holder and engageable with the first engaging portion.

* * * * *